(12) United States Patent
Koo

(10) Patent No.: US 7,027,033 B2
(45) Date of Patent: Apr. 11, 2006

(54) DISPLAY APPARATUS, ROTATING POSITION DETECTOR THEREOF AND PORTABLE COMPUTER SYSTEM HAVING THE SAME

(75) Inventor: Ja-goun Koo, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 404 days.

(21) Appl. No.: 10/284,336

(22) Filed: Oct. 31, 2002

(65) Prior Publication Data

US 2003/0122781 A1 Jul. 3, 2003

(30) Foreign Application Priority Data

Jan. 3, 2002 (KR) ................................ 2002-274
May 8, 2002 (KR) ................................ 2002-25327

(51) Int. Cl.
*G09G 5/08* (2006.01)
(52) U.S. Cl. .................................... 345/158
(58) Field of Classification Search ................ 345/158, 345/55, 82, 659, 173, 427, 418, 660; 128/203.15; 451/556.2, 59; 382/6, 1, 133; 361/681; 348/333.01
See application file for complete search history.

(56) References Cited

U.S. PATENT DOCUMENTS

| | | | | |
|---|---|---|---|---|
| 5,134,390 A | * | 7/1992 | Kishimoto et al. | 345/659 |
| 5,134,662 A | * | 7/1992 | Bacus et al. | 382/133 |
| 5,432,720 A | * | 7/1995 | Lucente et al. | 361/681 |
| 5,566,098 A | * | 10/1996 | Lucente et al. | 361/681 |
| 5,708,561 A | * | 1/1998 | Huilgol et al. | 361/681 |
| 5,774,602 A | * | 6/1998 | Taguchi et al. | 382/314 |
| 6,061,064 A | * | 5/2000 | Reichlen | 345/418 |
| 6,149,506 A | * | 11/2000 | Duescher | 451/59 |
| 6,181,381 B1 | * | 1/2001 | Evans | 348/333.01 |
| 6,392,613 B1 | * | 5/2002 | Goto | 345/30 |
| 6,396,497 B1 | * | 5/2002 | Reichlen | 345/427 |
| 6,434,403 B1 | * | 8/2002 | Ausems et al. | 455/556.2 |
| 6,522,529 B1 | * | 2/2003 | Huilgol et al. | 361/681 |
| 6,700,773 B1 | * | 3/2004 | Adriaansen et al. | 361/680 |
| 2004/0050385 A1 | * | 3/2004 | Bonney et al. | 128/203.15 |
| 2004/0080468 A1 | * | 4/2004 | Wakefield | 345/55 |
| 2004/0183817 A1 | * | 9/2004 | Kaasila | 345/660 |
| 2005/0110768 A1 | * | 5/2005 | Marriott et al. | 345/173 |

FOREIGN PATENT DOCUMENTS

| | | |
|---|---|---|
| JP | 63-226389 | 9/1988 |
| JP | 4-40492 | 2/1992 |
| JP | 8-129557 | 2/1996 |

(Continued)

*Primary Examiner*—Vijay Shankar
*Assistant Examiner*—Prabodh Dharia
(74) *Attorney, Agent, or Firm*—Staas & Halsey LLP

(57) ABSTRACT

A display apparatus correctly detecting a rotated position of a display part and automatically displaying a rotated picture according to rotation of the display part. The display apparatus has a display part displaying a picture based on a video signal thereon; a video signal processing part transmitting the video signal to the display part; a rotating position detector including a mass body, a housing having a plurality of pockets in which the mass body is selectively retained according to a rotated position of the display part, and a plurality of contact sensors respectively placed in the pockets and generating a contact signal upon contact with the mass body; and a controller controlling the video signal processing part so as to display a rotated picture according to the rotated position of the display part based upon the contact signal from the rotating position detector.

6 Claims, 12 Drawing Sheets

FOREIGN PATENT DOCUMENTS

| | | |
|---|---|---|
| JP | 10-301695 | 11/1998 |
| JP | 11-504540 | 4/1999 |
| JP | 11-196397 | 7/1999 |
| JP | 11-338410 | 12/1999 |
| KR | 1999-0074340 | 10/1999 |
| WO | WO 00/68766 | 11/2000 |

* cited by examiner

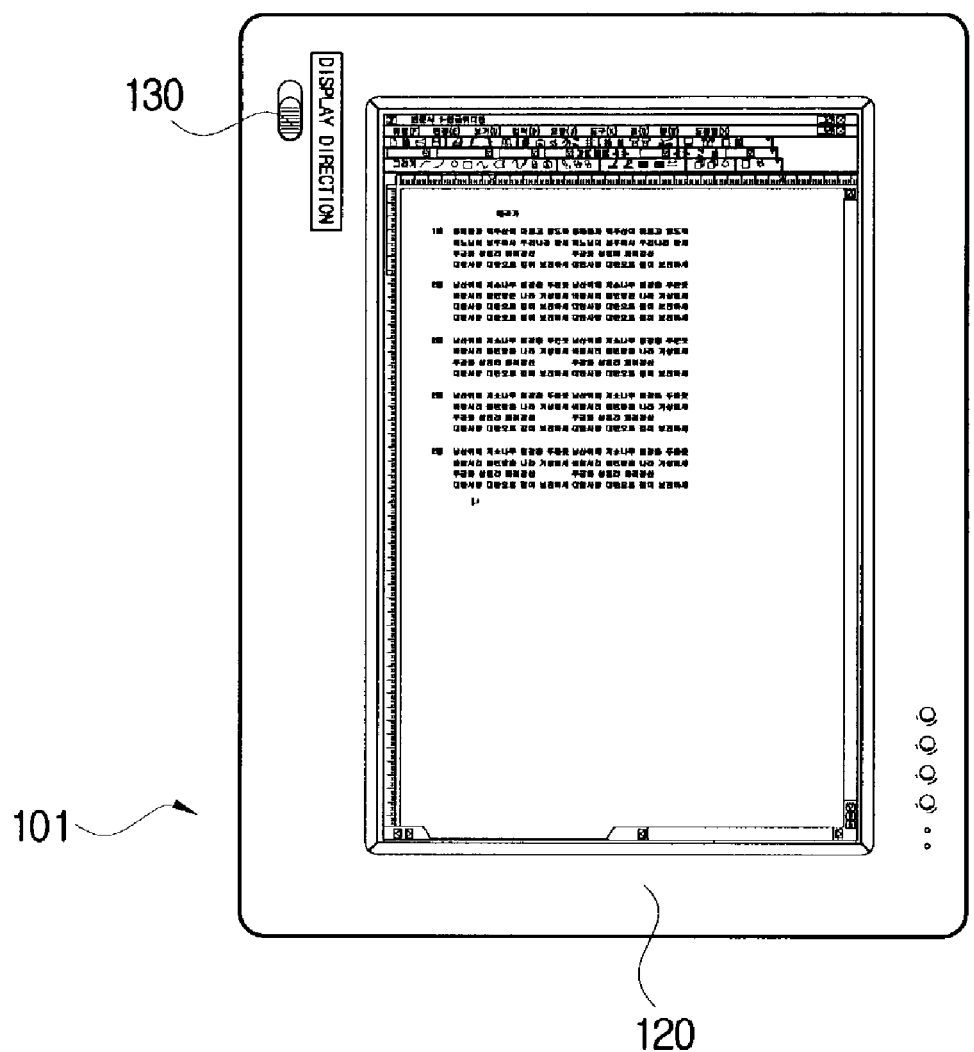

DISPLAY APPARATUS, ROTATING POSITION DETECTOR THEREOF AND PORTABLE COMPUTER SYSTEM HAVING THE SAME

CROSS-REFERENCE TO RELATED APPLICATIONS

This application claims the benefit of Korean Application No. 2002-274 filed Jan. 3, 2002 and the Korean Application No. 2002-25327 filed May 8, 2002, in the Korean Intellectual Property Office, the disclosures of which are incorporated herein by reference.

BACKGROUND OF THE INVENTION

1. Field of the Invention

The present invention relates to a display apparatus, a rotating position detector thereof and a portable computer system having the same, and more particularly, to a display apparatus, a rotating position detector thereof and a portable computer system having the same, which can vary a display mode of a picture according to rotation of a display part.

2. Description of the Related Art

Generally, a display apparatus displays a picture on a display part thereof in either a horizontal or a vertical direction. As shown in FIGS. 1 and 3, a conventional display apparatus 101 is provided with a convertible switch 130 provided in the display part 120 so as to convert a display direction of a picture according to a rotated position of the display part 120.

If a user would like to rotate the display part 120, the display direction of the picture can be changed by manipulating the convertible switch 130 after rotating and disposing the display part 120, thereby varying the display direction of the picture. For example, it may be desirable to display Microsoft Excel files and the like in a horizontal direction as shown in FIG. 2A, and it may be desirable to display general text files in a vertical direction after rotating the display part 120 to 90 degrees (90°) as shown in FIG. 2B.

However, to operate the convertible switch 130 provided in the conventional portable computer, the display part 120 has to be first rotated. Further, even if the convertible switch 130 is erroneously operated under the condition that the display part 120 is not rotated, a picture is output to the display part 120 in an incorrect display direction.

In addition, the convertible switch 130 for converting a display direction of pictures from the conventional portable computer is limited in either a horizontal or a vertical direction. The technology disclosed in Japanese Patent First Publication No. 1996-129557 allows one of four directions to be selected, however, it requires four switches corresponding to four directions.

Further, in the Japanese Patent First Publication No. 1996-129557, there was proposed a direction sensor using mercury. However, the mercury causes environmental problems.

Furthermore, in the Japanese Patent First Publication No. 1999-196397, there was proposed a direction sensor employing a metal ball and a plurality of piezoelectric sensors arranged at regular intervals along the inner circumference of a spherical casing, which can sense the rotated position by pressure-contact of the metal ball and the piezoelectric sensor due to the weight of the metal ball. However, the spherical casing cannot allow the metal ball to keep stable contact with the piezoelectric sensor, so that it is difficult to sense the rotated position correctly.

SUMMARY OF THE INVENTION

Accordingly, the present invention has been made keeping in mind at least the above-described shortcomings and user's needs, and an object of the present invention is to provide a display apparatus having a display part and a rotating position detector of the display part in a computer and/or a portable computer system, which can easily and correctly vary a display mode of images/pictures according to a rotated position of the display part. Further, according to the invention, the display mode of the images/pictures can be varied without user input and/or manual switch manipulation.

Additional objects and advantages of the invention will be set forth in part in the description which follows and, in part, will be obvious from the description, or may be learned by practice of the invention.

The present invention may be accomplished by providing a display apparatus comprising a display part displaying a picture based on a video signal thereon; a video signal processing part transmitting the video signal to the display part; a rotating position detector including a mass body, a housing having a plurality of pockets in which the mass body is selectively retained according to a rotated position of the display part, and a plurality of contact sensors each placed in the pockets and generating a contact signal upon contact with the mass body; and a controller controlling the video signal processing part so as to display a rotated picture according to the rotated position of the display part based upon the contact signal from the rotating position detector.

According to an aspect of the invention, the display apparatus further comprises a guiding projection part inwardly protruding from an inside wall of the housing between two adjacent pockets, and guiding the mass body to one of the pockets.

According to an aspect of the invention, the mass body is in a shape of a ball.

According to another aspect of the present invention, the invention may be also achieved by providing a rotating position detector of a display apparatus having a display part displaying a picture, the detector comprising a mass body; a housing having a plurality of pockets in which the mass body is selectively retained according to a rotated position of the display part; and a plurality of contact sensors each placed in the pockets and generating a contact signal upon contact with the mass body.

According to an aspect of the invention, the rotating position detector further comprises a guiding projection part inwardly protruding from an inside wall of the housing between two adjacent pockets, and guiding the mass body to one of the pockets.

According to an aspect of the invention the mass body is in a shape of a ball.

According to another aspect of the present invention, the invention may be also achieved by providing a portable computer system having a main body and a display apparatus having a display part, the portable computer system comprising a video signal processing part transmitting a video signal to the display part of the display apparatus; a rotating position detector provided in one of the main body and the display apparatus, and including a mass body, a housing having a plurality of pockets in which the mass body is selectively retained according to a rotated position of the display part, and a plurality of contact sensors each placed in the pockets and generating a contact signal upon contact with the mass body; and a controller controlling the video signal processing part so as to display a rotated picture according to the rotated position of the display part based upon the contact signal from the rotating position detector.

According to an aspect of the invention, the portable computer system further comprises a guiding projection part inwardly protruding from an inside wall of the housing between two adjacent pockets, and guiding the mass body to one of the pockets.

According to an aspect of the invention, the mass body is in a shape of a ball.

BRIEF DESCRIPTION OF THE DRAWINGS

The present invention will be better understood and its various objects and advantages will be more fully appreciated from the following description of the preferred embodiments taken in conjunction with the accompanying drawings, in which:

FIGS. 2A and 2B are views demonstrating a display status from the display apparatus of FIG. 1;

DETAILED DESCRIPTION OF THE PREFERRED EMBODIMENTS

Figure 1:
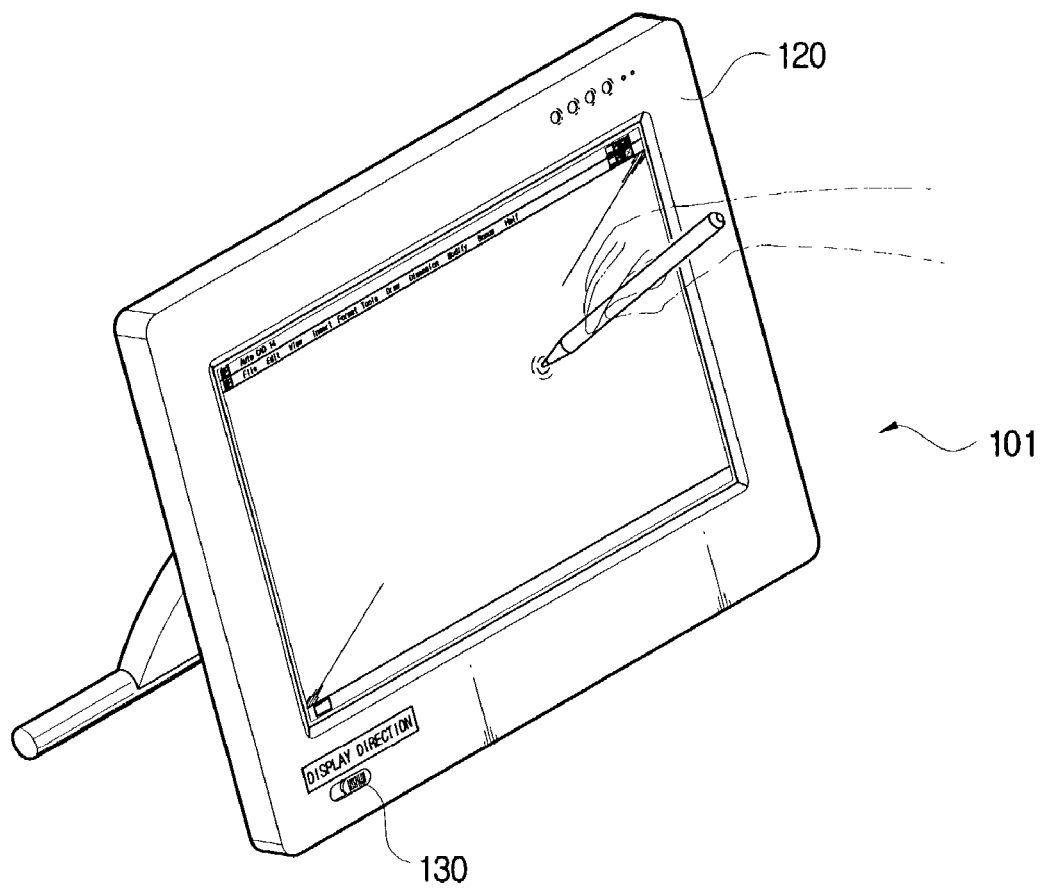
FIG. 1 is a perspective view of a conventional display apparatus.
Figure 2A:
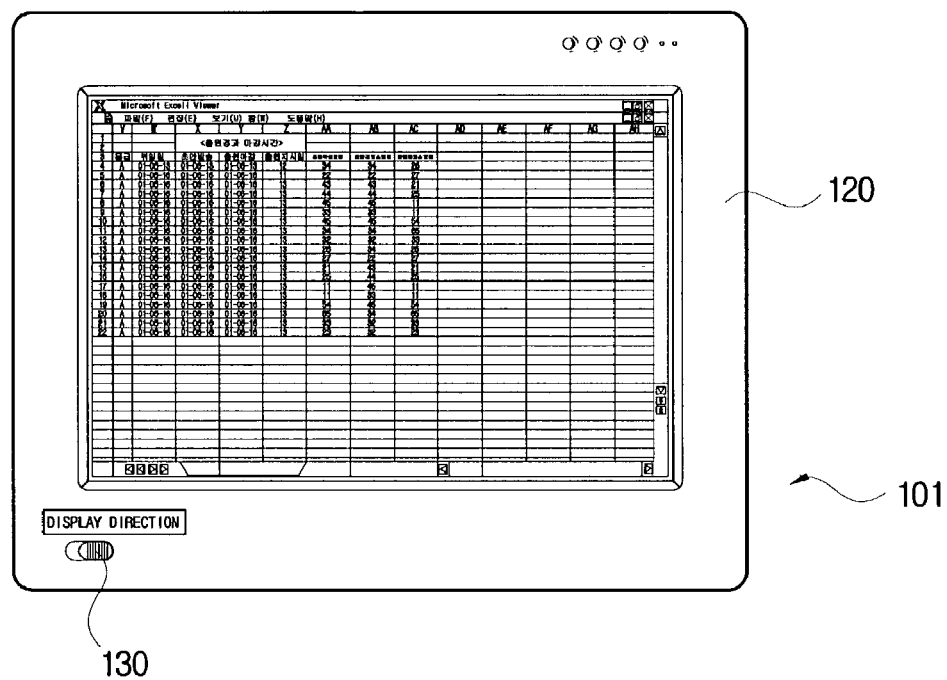
Figure 3:
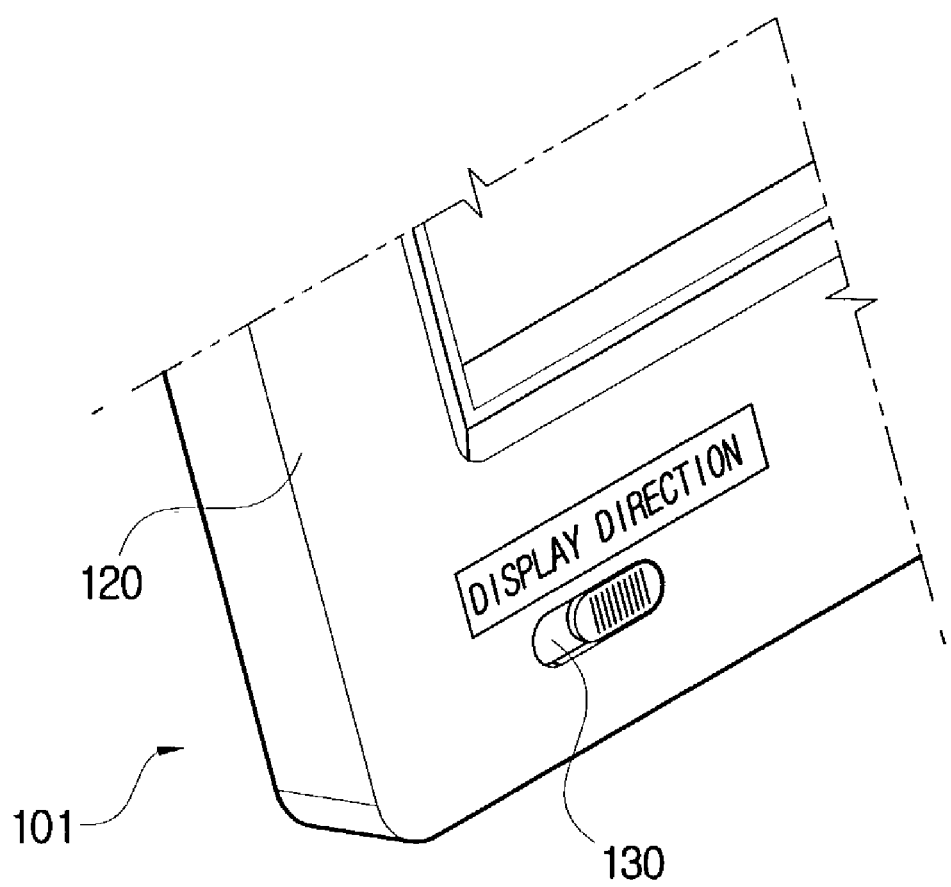
FIG. 3 is a partial enlarged view of FIG. 1.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 4:
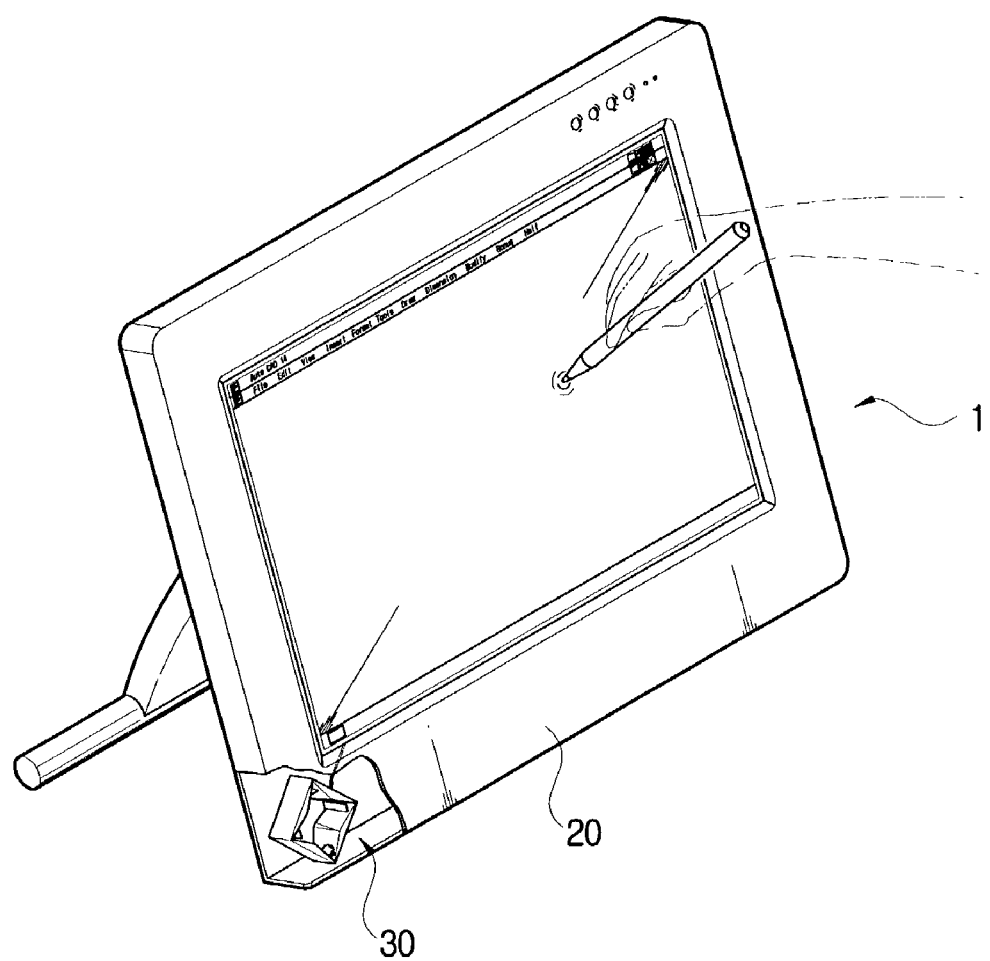
FIG. 4 is a perspective view of a display apparatus according to an embodiment of the present invention.
Figure 5:
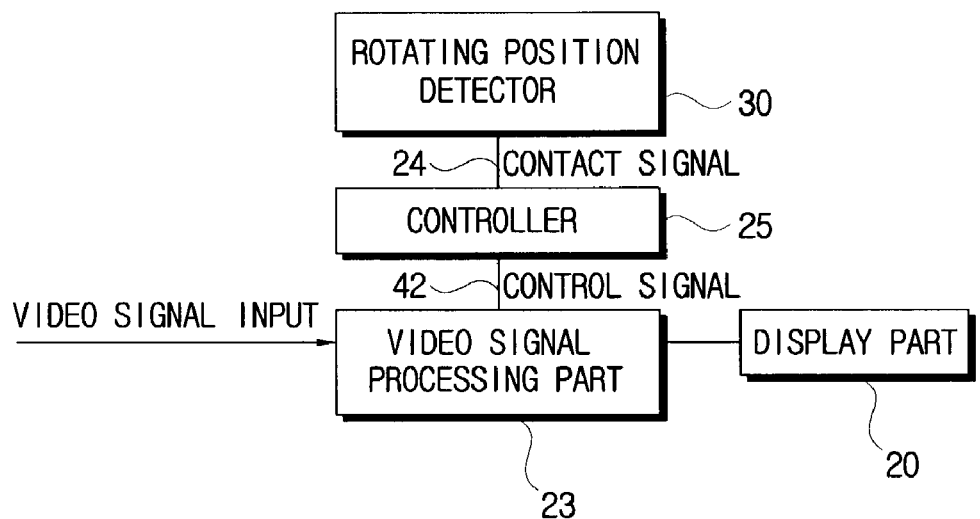
FIG. 5 is a control block diagram of a display apparatus according to an embodiment of the present invention.

FIG. 4 is a perspective view of a display apparatus 1 according to an embodiment of the present invention, and FIG. 5 is a control block diagram of the display apparatus 1 of FIG. 4. As shown in these figures, the display apparatus 1 comprises a display part 20 displaying a picture thereon, a video signal processing part 23 transmitting a video signal to the display part 20, a rotating position detector 30 detecting a rotated position of the display part 20, and a controller 25 controlling the video signal processing part 23 so as to display a rotated picture based on a contact signal 24 from the rotating position detector 30. The controller 25 and the video signal processing part 23 may be integrated with the display apparatus 1 and/or may be separate and in communication with the display apparatus 1, according to known techniques.

The video signal processing part 23 converts a control signal 42 from the controller 25 into a proper video signal for the display part 20 (i.e., the video signal processing part 23 outputs a video signal according to a converted display mode in response to the control signal 42 representing a rotated position of the display part 20), and the display part 20 displays a picture based on the converted video signal. The rotating position detector 30 is provided inside the display apparatus 1, and detects the rotated position of the display part 20.

Figure 6:
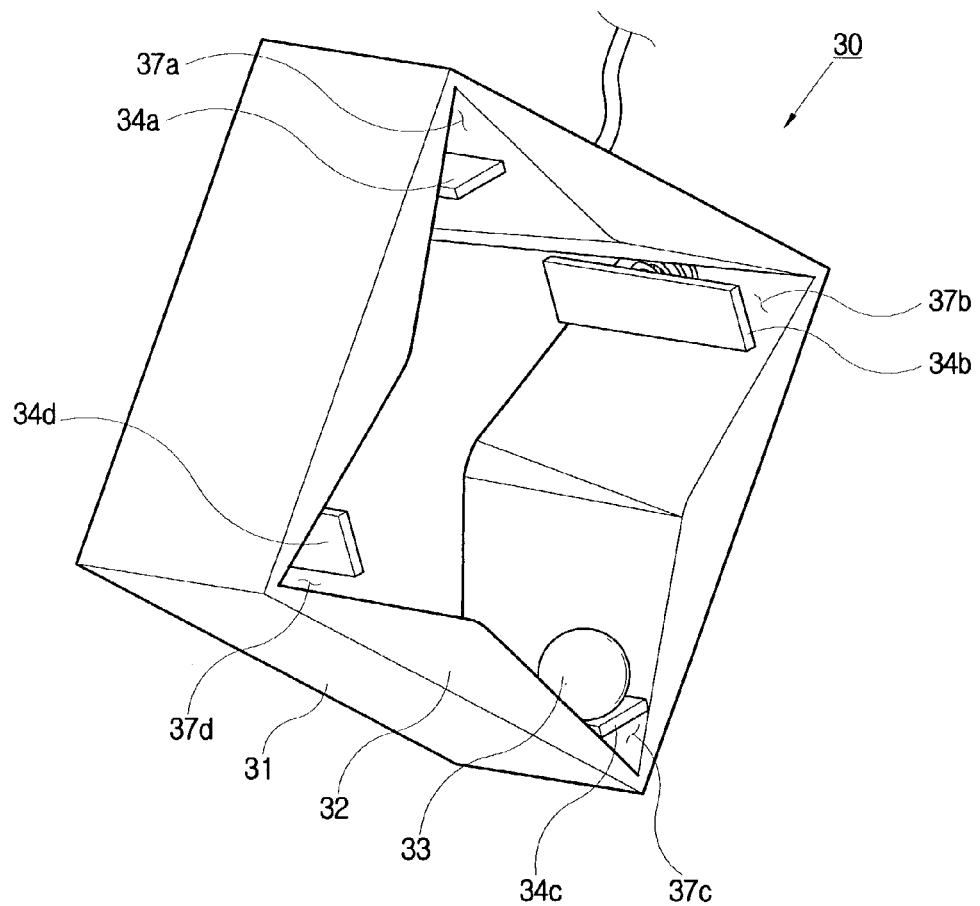
FIG. 6 is a perspective view of a rotating position detector provided in the display apparatus of FIG. 4, according to an embodiment of the present invention.
Figure 7:
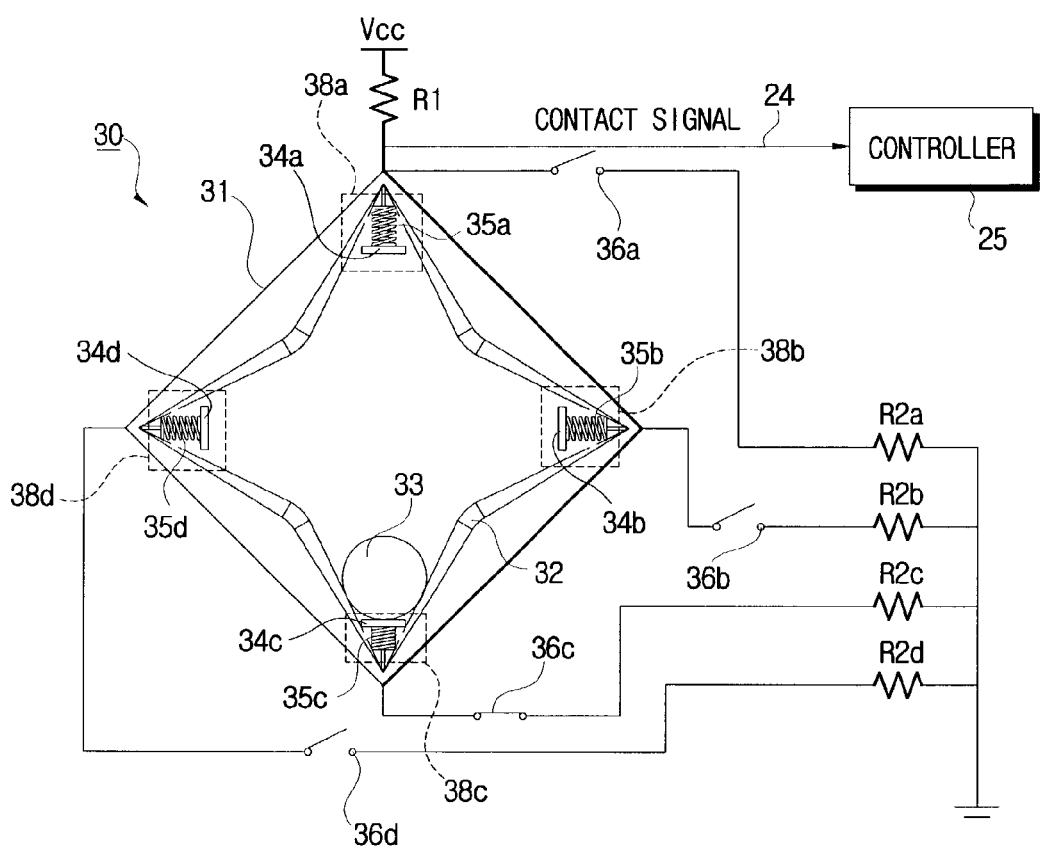
FIG. 7 is a circuit diagram of the rotating position detector of FIG. 6 and peripheral elements thereof according to an embodiment of the present invention.

As shown in FIGS. 6 and 7, the rotating position detector 30 includes a mass body (position sensing member) 33, a housing 31 having a plurality of pockets 37a, 37b, 37c and 37d in which the mass body 33 is movably retained, and a plurality of contact sensors 38a–d (to be described later) respectively placed in each pocket 37a, 37b, 37c and 37d and generating a contact/sensed signal 24 when in contact with the mass body 33.

Typically, the mass body 33 is in a ball shape, made of metal, and is selectively accommodated in one of the pockets 37a, 37b, 37c and 37d according to the rotated position of the display part 20, thereby press-contacting with each contact sensor.

Typically, the housing 31 is in a box shape, such as a rectangular box, has the plurality of pockets 37a, 37b, 37c and 37d, and houses the mass body 33 therein. Between the pockets 37a, 37b, 37c and 37d is respectively formed a guiding projection part 32 inwardly protruded from an inside wall of the housing 31 like a mountain shape so as to guide the mass body 33 housed in the housing 31 to one of the pockets 37a, 37b, 37c and 37d according to the rotated position of the display part 20. Thus, when the display part 20 is rotated and the rotating position detector 30 stands, the mass body 33 is easily guided to one of contact sensors 38, thereby facilitating efficient contact with the contact sensors 38. Further, the mass body 33 is stably supported by contact with the guiding projection part 32 at two points thereof between pockets 37a, 37b, 37c and 37d.

As shown in FIG. 7, the contact sensors 38a–d are respectively placed in the pockets 37a, 37b, 37c and 37d, and comprise contact plates 34a, 34b, 34c and 34d, springs 35a, 35b, 35c and 35d, and switches 36a, 36b, 36c and 36d. Thus, when the mass body 33 comes in contact with the contact plate 34a, 34b, 34c or 34d, the spring 35a, 35b, 35c or 35d is pressed by weight of the mass body 33. Then, the switch 36a, 36b, 36c or 36d engaged with the spring 35a, 35b, 35c or 35d is switched on, and the contact signal 24 is generated and transmitted to the controller 25.

The controller 25 is electrically connected to the contact sensors 38 of the rotating position detector 30, and receives the contact signal 24 from the contact sensors 38. Thus, on the basis of the contact signal 24 received from the contact sensors 38, the controller 25 transmits a control signal 42 to the video signal processing part 23 so as to display a picture according to a converted display mode due to a rotated position of the display part 20. On the basis of the control signal received from the controller 25, the video signal processing part 23 outputs a video signal according to the converted display mode due to the rotated position of the display part 20.

Figure 8:
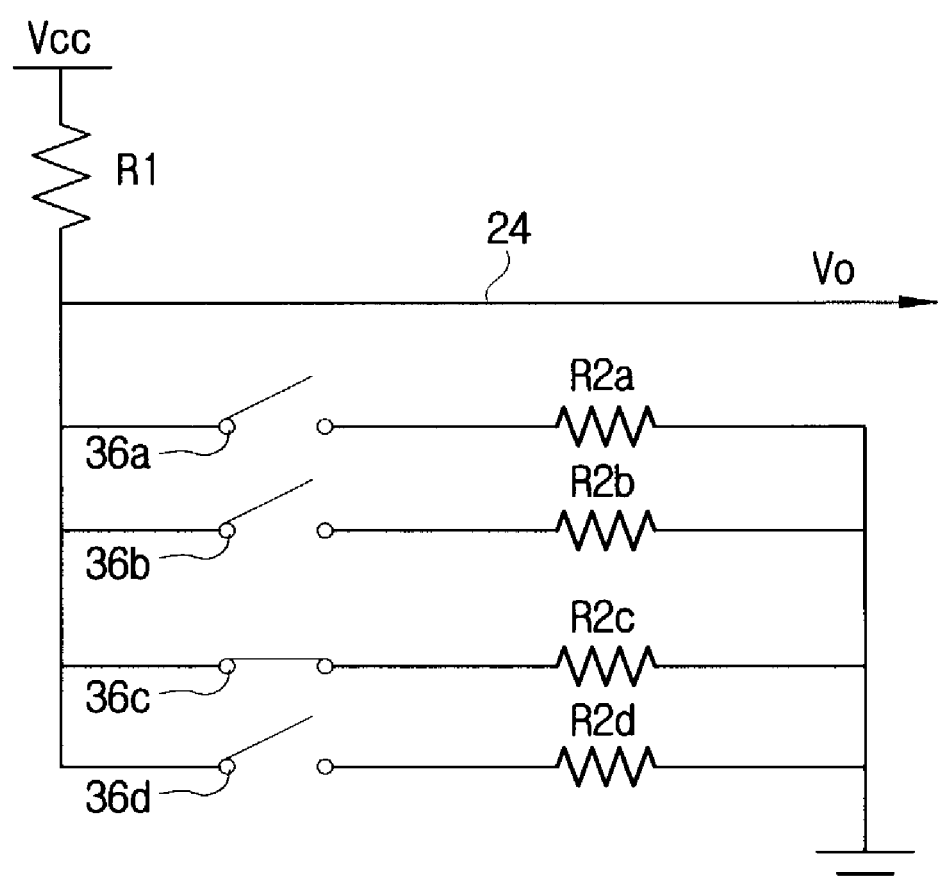
FIG. 8 is a schematic circuit diagram of FIG. 7.

FIG. 7 is a circuit diagram of the rotating position detector 30 and peripheral elements thereof, including the controller 25, according to an embodiment of the present invention. A resistor "R1" is connected to the rotating position detector 30, and resistors "R2a, R2b, R2c and R2d" different from each other in resistance are connected to the switches 36a, 36b, 36c and 36d, respectively. A power source "Vcc" and the controller 25 are connected to opposite ends of the resistor "R1", respectively. FIG. 8 is a schematic circuit diagram of FIG. 7.

The process of transmitting the contact signal 24 to the controller 25 will be described below with reference to FIGS. 7 and 8. For example, when the mass body 33 is in contact with the contact plate 34c, the spring 35c is pressed and the switch 36c is switched on. Then, to the controller 25 is applied a voltage "Vo" computed according to the resistor "R2c" connected to the switch 36c. Herein, the voltage "Vo" to be applied to the controller 25 is determined according to voltage division between the resistor "R1" and each resistor "R2a, R2b, R2c or R2d." Because the resistors "R2a, R2b, R2c and R2d" each connected to the switches 36a, 36b, 36c and 36d are different from each other in resistance, the voltage "Vo" is differently applied to the controller 25 according to which one of the switches 36a, 36b, 36c and 36d is switched on. That is, the voltage "Vo" to be applied to the controller 25 (i.e., the intensity of the contact signal 24) varies according to the contact plates 34a, 34b, 34c and 34d coming in contact with the mass body 33 in correspondence with the rotated position of the display part 20 (i.e., according to a contact position).

Thus, if a user rotates the display part 20 along the planar surface thereof, the mass body 33 freely moves due to its weight, being guided by the guiding projection part 32 into one of the pockets 37a, 37b, 37c and 37d. The mass body 33 in the pocket 37a, 37b, 37c or 37d comes in contact with one of the contact sensors 38 placed in the pockets 37a, 37b, 37c and 37d. Then, the contact sensor 38 in contact with the mass body 33 generates the contact signal 24 varied according to the contact position. On the basis of the contact signal 24 generated from the contact sensor 38, the controller 25 transmits a control signal 42 to the video signal processing part 23 so as to display a picture according to a converted display mode due to a rotated position of the display part 20. On the basis of the control signal 42 transmitted from the controller 25, the video signal processing part 23 displays a picture based on a video signal according to the converted display mode on the display part 20 (see FIG. 10).

Figure 11:
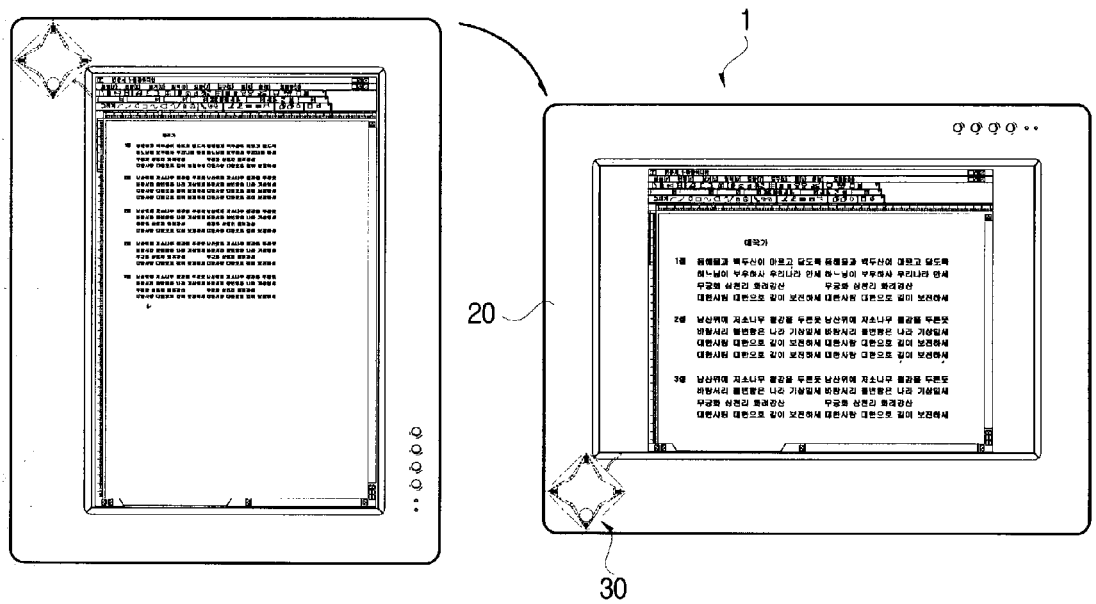

Besides a display direction of a picture, the size of a picture may be changed according to the rotated position of the display part 20 (see FIG. 11). This can be achieved by controlling the video signal processing part 23 so as to display a picture whose display direction is rotated and size is changed according to the rotated position of the display part 20.

According to an aspect of the invention, the display apparatus 1 is provided in a portable computer system, such as a laptop computer, a notebook computer, a PDA (personal digital assistant), etc.

Figure 9:
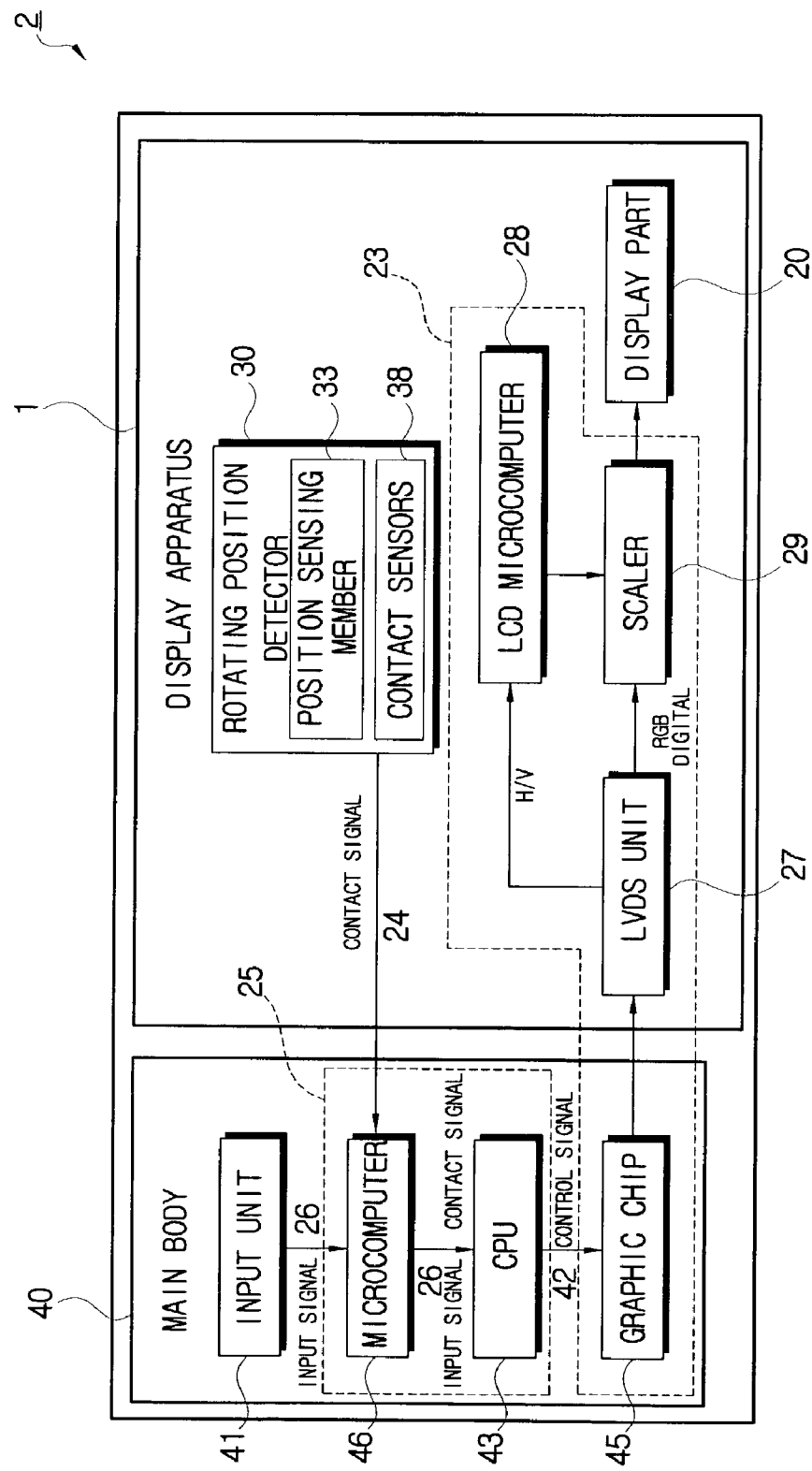
FIG. 9 is a control block diagram of a portable computer system with the display apparatus of FIG. 4, according to an embodiment of the present invention.

FIG. 9 is a control block diagram of a portable computer system with the display apparatus of FIG. 4, according to an embodiment of the present invention. As shown therein, the portable computer system 2 comprises the display apparatus 1 and a main body 40 provided on the rear face of the display apparatus 1.

The main body 40 comprises an input unit 41 through which input signals 26 are input, a microcomputer 46 in communication with the input unit 41, a central processing unit (CPU) 43 executing application programs and a variety of operations, according to the input signals 26 and the contact signals 24 received through the microcomputer 46, and a graphic chip 45 generating a video signal according to driving of the CPU 43 and transmitting the video signal to the display part 20. In particular, typically the microcomputer 46 and the CPU 43 provide an example embodiment of the controller 25. In particular, further, typically the graphic chip 45 and other components in connection therewith, embody according to known techniques a video signal processing part 23 which is in communication with a CPU and performs video signal conversion in response to a rotated position of the display part. Although, such video signal processing can be embodied in software and/or hardware and may be part of the CPU or provided in a computer and in communication with a rotating position detector of the invention according to other known techniques.

The microcomputer 46 is in communication with the input unit 41 and transmits the input signal from the input unit 41 to the CPU 43 through a south bridge chip (not shown) and so on, using conventional techniques. The CPU 43 performs a variety of operations according to the input signals 26 and the contact signals 24 and the CPU 43 outputs values obtained from the operations to the display part 20 through the graphic chip 45.

The microcomputer 46 is also electrically connected to the contact sensors 38 of the rotating position detector 30, to thereby receive the contact signals 24 from the contact sensors 38. Accordingly, typically the microcomputer 46 generates interrupts through the south bridge chip and so on and transmits the contact signals 24 from the contact sensors 38 to the CPU 43.

Typically, the CPU 43 processes the input signals 26 and the contact signals 24 via executing application programs and other known operations to transmit a control signal 42 to the graphic chip 45 so as to allow the graphic chip 45 to generate a video signal for a picture rotated according to a rotated position of the display part 20 on the basis of the contact signal 24 from the microcomputer 46. The graphic chip 45 generates the video signal for a picture rotated according to the rotated position of the display part 20 in response to the control signal 42 from the CPU 43, and outputs the video signal to the display part 20.

Typically, the display apparatus 1 comprises a low voltage differential signaling (LVDS) unit 27 decompressing the video signal received from the main body 40, a liquid crystal display (LCD) microcomputer 28 processing synchronous signals, a scaler 29 adjusting the video signal based on the synchronous signals supplied from the LCD microcomputer 28, and an LCD employed as the display part 20 and displaying thereon a picture based on the video signal adjusted by the scaler 29.

The LVDS unit 27 receives the video signal from the graphic chip 45. The LVDS unit 27 decompresses the received video signal, and then synchronous signals of horizontal and vertical signals are transmitted to the LCD microcomputer 28 and RGB signals are transmitted to the scaler 29.

The LCD microcomputer 28 determines a resolution of the video signal based on the horizontal and vertical signals from the LVDS unit 27 and supplies the synchronous signals to the scaler 29 so as to allow the RGB signal to be adjusted by the scaler 29 according to the determined resolution. The scaler 29 adjusts the RGB signals transmitted from the LVDS unit 27 adaptively to a size of the display part 20 based on the synchronous signals supplied from the LCD microcomputer 28 and outputs the RGB signals to the display part 20.

Figure 10:
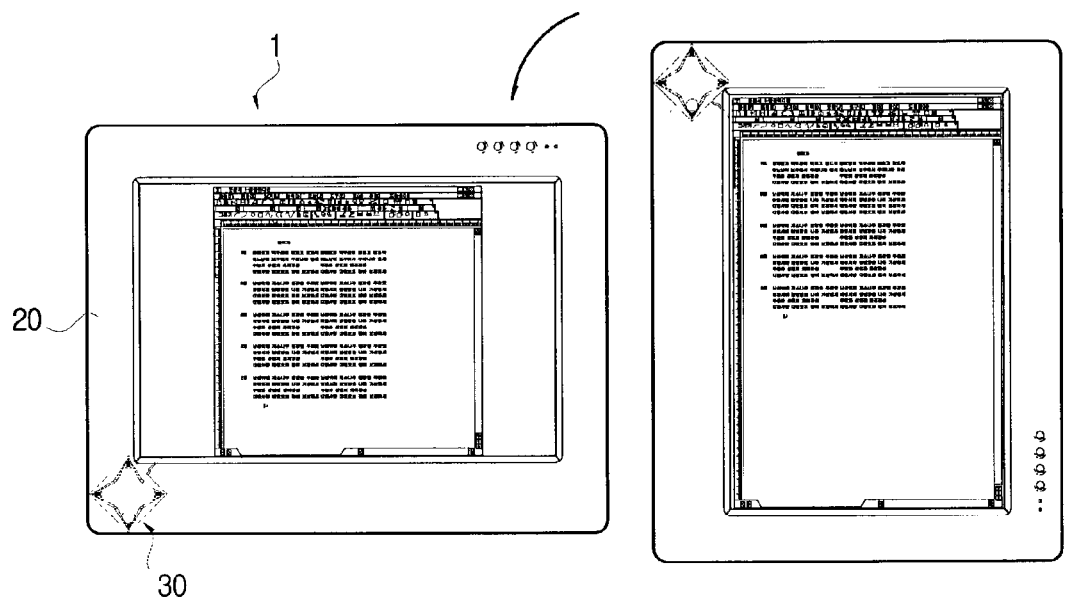
FIGS. 10 and 11 are views demonstrating a display status from the display apparatus of FIG. 4.

That is, in the portable computer system 2, the graphic chip 45, the LVDS unit 27, the scaler 29 and the LCD microcomputer 28 are employed as the video signal processing part 23. These components are controlled by the microcomputer 46 and the CPU 43 provided in the main body 40 in response to the contact signal 24 of the rotating position detector 30, to thereby display a picture on the display part 20 based on the converted display mode due to the rotated position of the display part 20. Thus, the display part 20 can have a display status as shown in FIGS. 10 and 11.

In the forgoing embodiment, the mass body 33 is in a ball shape. However, the mass body 33 may have an amorphous shape, a cylindrical shape, a polyhedral shape, etc.

In the foregoing embodiment, the housing 31 is a rectangular box shape. However, the housing 31 may be shaped like a circular cylinder, a polygonal cylinder, etc.

In the foregoing embodiment, the plurality of contact sensors 38 is placed in the plurality of pockets 37a, 37b, 37c and 37d, respectively. However, instead of the plurality of contact sensors 38, switches outputting different values from each other can be provided (for example, in case of four directions, four values would be generated). In this case, each switch outputs a proper value predetermined according to a contact with the mass body, and the video signal processing part 23 receives a control signal 42 based on an output value from the controller 25, thereby displaying a rotated picture on the displaying part 20.

Although the example embodiment of the rotating position detector 30 can detect four rotational positions of the display part 20, the present invention is not limited to such a configuration. Any two or more directional positions of a display part 20 can be detected according to the present invention by increasing/decreasing number of the pockets 37 and corresponding contact sensors 38, and providing the pockets 37 corresponding to other desired directional positions within a housing 31 to receive/accommodate the body mass 33.

In the foregoing embodiment, the guiding projection part 32 has a peaked mountain shape. However, the guiding projection part 32 may have various projecting shapes, such as a semicircular mountain shape, etc.

In the foregoing embodiment, the contact sensors 38 are electrically connected to the controller 25 provided in the display apparatus 1 and transmit the contact signals 24 to the controller 25 according to rotated positions of the display part 20. However, in a case of a desktop computer system, the contact sensors 38 may be electrically connected to the graphic chip 45 provided in main body of the desktop computer. In this case, the graphic chip 45 generates a video signal according to a converted display mode based on the contact signal 24 directly received from a contact sensor 38, and the video signal is output to the display part 20.

In the foregoing embodiment, the rotating position detector 30 is provided in the display apparatus 1. However, the rotating position detector 30 may be provided in a computer main body. On the other hand, the present invention can be applied to a display apparatus including as the display part 20 a PDP (plasma display panel), an ELD (electro luminescent display), etc., as well as the LCD.

As described above, the present invention provides a rotating position detector comprising a housing having pockets selectively receiving and stably (for example, substantially stable) retaining a mass body detecting a rotated position of a display part in contact with a contact sensor of the pockets, thereby generating a contact signal, and a controller controlling a video signal processing part so as to display a picture based on a display mode converted according to the contact signal from the rotating position detector. With this configuration, there can be provided a display apparatus, a rotating position detector thereof and a computer system having the same, which can correctly detect a rotated position of a display part of the display apparatus and automatically vary a display mode according to rotation of the display part (i.e., a display apparatus correctly detecting a rotated position of a display part and automatically displaying a rotated picture according to rotation of the display part.

As described above, the present invention provides a display apparatus having a display part displaying images comprising a position detector comprising a housing having position sensing pockets (for example, the pockets 37 with contact sensors 38) selectively receiving and retaining a mass body in contact with each sensing pocket upon rotation of the display part to generate a rotation-position signal; and a controller automatically converting a display mode of the images on the display part in response to the rotation-position signal. The display mode can be one or more of a display direction of the images, a size of the images (e.g., zooming), and image characteristics (e.g., shading), the position detector thereby providing automatic display mode conversion/change, as configured corresponding to a rotation position, without user data/command input using typical input units, such as switches, keyboard, mouse. Further, the position detector of the present invention can be implemented to detect directional position of any apparatus.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus comprising:
   a display part displaying a picture based on a video signal thereon;
   a video signal processing part transmitting the video signal to the display part;
   a rotating position detector comprising a mass body, a housing having a plurality of pockets in which the mass body is selectively retained according to a rotated position of the display part and a guiding projection part inwardly protruding from an inside wall of the housing between two adjacent pockets guiding the mass body to one of the packets and contact sensors respectively placed in the pockets and generating a contact signal upon contact with the mass body; and
   a controller controlling the video signal processing part so as to display a rotated picture according to the rotated position of the display part based upon the contact signal from the rotating position detector.

2. A display apparatus comprising:
   a display part displaying a picture based on a video signal thereon;
   a video signal processing part transmitting the video signal to the display part;
   a rotating position detector comprising a mass body, a housing having a plurality of pockets in which the mass body is selectively retained according to a rotated position of the display part, and contact sensors respectively placed in the pockets and generating a contact signal upon contact with the mess body; and
   a controller controlling the video signal processing part so as to display a rotated picture according to the rotated position of the display part based upon the contact signal from the rotating position detector, wherein the mass body is in a ball shape.

3. A rotating position detector of a display apparatus having a display part displaying a picture, comprising:
   a mass body;
   a housing having pockets in which the mass body is selectively retained according to a rotated position of the display part and a guiding projection part inwardly protruded from an inside wall of the housing between two adjacent pockets guiding the mass body to one of the pockets; and a plurality of contact sensors each placed in the pockets and generating a contact signal upon contact with the mass body.

4. A rotating position detector of a display apparatus having a display part displaying a picture, comprising:

a mass body, a housing having pocket in which the mass body is selectively retained according to a rotated position of the display part; and a plurality of contact sensors each placed in the pocket and generating a contact signal upon contact with the mass body, wherein the mass body is in a ball shape.

5. A portable computer system having a main body and a display apparatus, comprising:

a video signal processing part transmitting a video signal to the display part a rotating position detector provided in one of the main body and the display apparatus, and including a mass body, a housing having a plurality of pockets in which the mass body is selectively retained according to a rotated position of the display part with a guiding projection part inwardly protruded from an inside wall of the housing between two adjacent pockets guiding the mass body to one of the pockets, and contact sensors respectively placed in the pockets and generating a contact signal upon contact with the mass body, and a controller controlling the video signal processing part so as to display a rotated picture according to the rotated position of the display part based upon the contact signal from the rotating position detector.

6. A portable computer system having a main body and a display apparatus, comprising:

a video signal processing part transmitting a video signal to the display part;

a rotating position detector provided in one of the main body and the display apparatus, and including a mass body, a housing having a plurality of pockets in which the mass body is selectively retained according to a rotated position of the display part, and contact sensors respectively placed in the pockets and generating a contact signal upon contact with the mass body; and a controller controlling the video signal processing part so as to display a rotated picture according to the rotated position of the display part based upon the contact signal from the rotating position detector, wherein the mass body is in a ball shape.

* * * * *

UNITED STATES PATENT AND TRADEMARK OFFICE
CERTIFICATE OF CORRECTION

PATENT NO. : 7,027,033 B2
APPLICATION NO. : 10/284336
DATED : April 11, 2006
INVENTOR(S) : Koo, Ja-goun It is certified that error appears in the above-identified patent and that said Letters Patent is hereby corrected as shown below:

Column 8, line 40: Delete "packets" and insert --pockets-- therefor.

Column 8, line 57: Delete "mess" and insert --mass-- therefor.

Column 9, line 10: After "body" delete "," and insert --;-- therefor.

Column 9, line 11: Delete "pocket" and insert --pockets-- therefor.

Column 9, line 14: Delete "pocket" and insert --pockets-- therefor.

Column 9, line 20: After "part" insert --;--.

Column 10, line 3: After "body" delete ";" and insert --;-- therefor.

Signed and Sealed this

Twenty-second Day of August, 2006

JON W. DUDAS
*Director of the United States Patent and Trademark Office*